(12) United States Patent
Moon et al.

(10) Patent No.: US 10,469,258 B2
(45) Date of Patent: Nov. 5, 2019

(54) APPARATUS AND METHOD FOR ENCRYPTION

(71) Applicant: SAMSUNG SDS CO., LTD., Seoul (KR)

(72) Inventors: Duk-Jae Moon, Seoul (KR); Kyu-Young Choi, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 43 days.

(21) Appl. No.: 15/610,813

(22) Filed: Jun. 1, 2017

(65) Prior Publication Data

US 2018/0123787 A1    May 3, 2018

(30) Foreign Application Priority Data

Oct. 28, 2016   (KR) .................. 10-2016-0142391

(51) Int. Cl.
| | |
|---|---|
| *H04L 9/08* | (2006.01) |
| *H04L 9/06* | (2006.01) |
| *G09C 1/00* | (2006.01) |
| *H04L 29/06* | (2006.01) |

(52) U.S. Cl.
CPC .............. *H04L 9/0861* (2013.01); *G09C 1/00* (2013.01); *H04L 9/0618* (2013.01); *H04L 9/083* (2013.01); *H04L 9/0869* (2013.01); *H04L 63/0428* (2013.01); *H04L 63/08* (2013.01); *H04L 63/0884* (2013.01); *H04L 2209/08* (2013.01); *H04L 2209/16* (2013.01)

(58) Field of Classification Search
CPC ..... H04L 9/0861; H04L 9/083; H04L 9/0869; H04L 63/0884; G09C 1/00

USPC ........................................................ 380/279
See application file for complete search history.

(56) References Cited

U.S. PATENT DOCUMENTS

| | | | | |
|---|---|---|---|---|
| 2004/0179682 | A1* | 9/2004 | Soliman .................... | H04L 9/00 380/44 |
| 2011/0150224 | A1* | 6/2011 | Noh et al. ................. | H04L 9/00 380/277 |
| 2012/0099726 | A1* | 4/2012 | Kim .......................... | H04L 9/08 380/44 |
| 2014/0282687 | A1* | 9/2014 | Kummer ............ | H04N 21/2393 725/31 |

(Continued)

FOREIGN PATENT DOCUMENTS

KR    10-2012-0079639 A    7/2012

OTHER PUBLICATIONS

A. Menezes et al., "Handbook of Applied Cryptography", Chapter 1 Overview of Cryptography, CRC Press, Inc., 1996, 49 pages.

(Continued)

*Primary Examiner* — Jason K Gee
*Assistant Examiner* — Abdullah Almamun
(74) *Attorney, Agent, or Firm* — Sughrue Mion, PLLC

(57) ABSTRACT

Disclosed are an encryption apparatus and method. The encryption apparatus includes a storage configured to store a static key table, and at least one processor configured to implement an authenticator configured to perform authentication with an external apparatus and acquire authentication information and a key table generator configured to generate a dynamic key table using authentication information acquired through the authentication.

8 Claims, 11 Drawing Sheets

(56) References Cited

U.S. PATENT DOCUMENTS

| | | | | |
|---|---|---|---|---|
| 2015/0172050 A1* | 6/2015 | Teuwen | ............... | H04L 9/0872 380/255 |
| 2015/0248668 A1* | 9/2015 | Radu | ...................... | G06F 21/14 705/71 |
| 2016/0092696 A1* | 3/2016 | Guglani | ............... | G06F 21/335 726/26 |
| 2017/0017957 A1* | 1/2017 | Radu | ................. | G06Q 20/3829 |

OTHER PUBLICATIONS

A. Menezes et al., "Handbook of Applied Cryptography", Chapter 12 Key Establishment Protocols, CRC Press, Inc., 1996, 54 pages.
Communication dated May 25, 2018, issued by the Korean Intellectual Property Office in counterpart Korean application No. 10-2016-0142391.

* cited by examiner

APPARATUS AND METHOD FOR ENCRYPTION

CROSS-REFERENCE TO RELATED APPLICATION

This application claims priority to and the benefit of Korean Patent Application No. 10-2016-0142391, filed on Oct. 28, 2016, the disclosure of which is incorporated herein by reference in its entirety.

BACKGROUND

1. Field

Embodiments of the present disclosure relate to encryption technology.

2. Discussion of Related Art

A conventional white box cipher implementation method has a structure in which an entire implementation of a cipher algorithm cannot be divisionally changed. Thus, the entire implementation should be simultaneously shared to perform encryption or decryption.

Accordingly, an encryption function can be illegally used by a user having no authority to use a service or can be stolen by an unauthorized terminal utilizing the entire implementation.

Korean Patent No. 10-1580879 proposes a method of updating a white box encryption implementation (including a key update). However, the update is made without analysis and authentication of attributes, and all entire information is shared. Thus, the method has weakness in that an unauthorized user uses an encryption function and an entire implementation thereof is exposed due to a lost terminal or a malicious attack.

SUMMARY

Embodiments of the present disclosure are directed to providing an apparatus and method for encryption.

According to an aspect of the present disclosure, there is provided an encryption apparatus including a storage configured to store a static key table, and at least one processor configured to implement: an authenticator configured to perform authentication with an external apparatus and acquire authentication information and a key table generator configured to generate a dynamic key table using the authentication information acquired through the authenticator authentication.

The key table generator may generate the dynamic key table using the static key table and the authentication information.

The at least one processor may further implement a key table provider configured to provide the dynamic key table to the external apparatus.

The at least one processor may further implement an encryption/decryption unit configured to perform encryption or decryption using the static key table and the dynamic key table.

According to another aspect of the present disclosure, there is provided an encryption apparatus including a storage configured to store a static key table, and at least one processor configured to implement: an authenticator configured to perform authentication with an external apparatus, and a key table acquirer configured to transmit the authentication information acquired through the authenticator to a key table generation sever and receive a dynamic key table generated using the transmitted authentication information from a key table generation server.

The key table acquirer may receive a dynamic key table generated using a static key table stored in the key table generation server and the transmitted authentication information from the key table generation server.

The at least one processor may further implement an encryption/decryption unit configured to perform encryption or decryption using the static key table and the dynamic key table.

According to another aspect of the present disclosure, there is provided an encryption apparatus including a storage configured to store a static key table, and at least one processor configured to implement: an authenticator configured to perform authentication with an external apparatus and acquire authentication information from the external apparatus and a key table acquirer configured to acquire a dynamic key table generated using the authentication information acquired through received by the authentication authenticator from the external apparatus.

The key table acquirer may receive a dynamic key table generated using a static key table stored in the external apparatus and the authentication information from the external apparatus.

The at least one processor may further implement an encryption/decryption unit configured to perform encryption or decryption using the static key table and the dynamic key table.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only an example, and the present disclosure is not limited thereto.

In describing embodiments of the present disclosure, when it is determined that a detailed description of known techniques associated with the present disclosure would unnecessarily obscure the subject matter of the present disclosure, the detailed description thereof will be omitted. Also, terms used herein are defined in consideration of the functions of the present disclosure and may be changed depending on a user, the intent of an operator, or a custom. Accordingly, the terms must be defined based on the following overall description of this specification. The terminology used herein is for the purpose of only describing embodiments of the present disclosure and should not be restrictive. The singular forms "a," "an," and "the" are intended to include the plural forms as well, unless the context clearly indicates otherwise. It should be understood that the terms "comprises," "comprising," "includes," and/or "including" specify the presence of stated features, integers, steps, operations, elements, and/or components when used herein, but do not preclude the presence or addition of one or more other features, integers, steps, operations, elements, components, and/or groups thereof.

Figure 1:
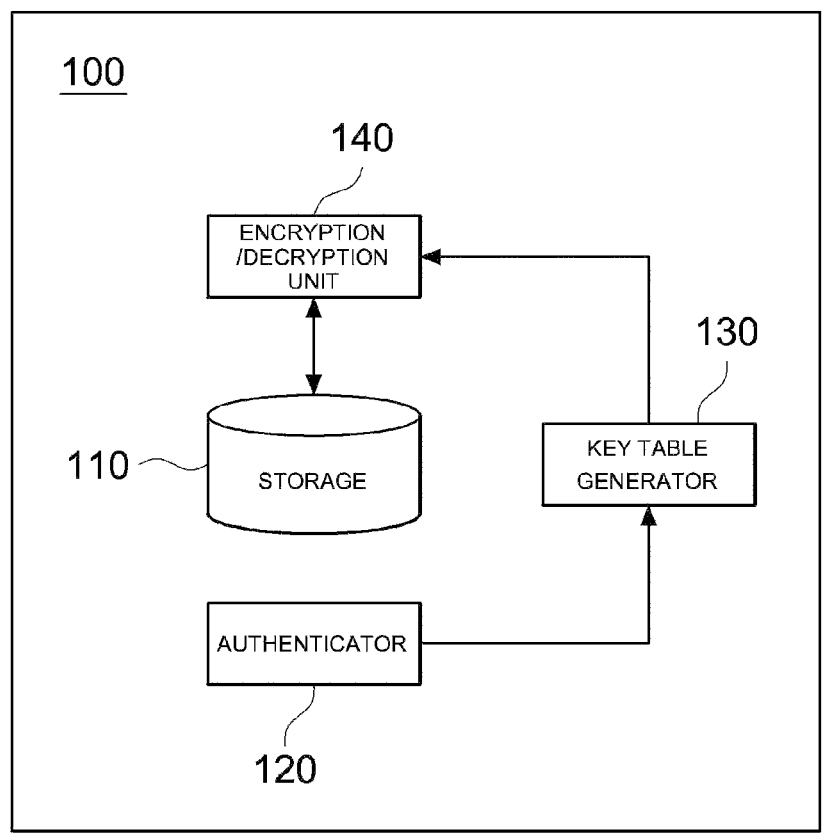
FIG. 1 is a block diagram of an encryption apparatus according to an embodiment of the present disclosure.

FIG. 1 is a block diagram of an encryption apparatus according to an embodiment of the present disclosure.

Referring to FIG. 1, an encryption apparatus 100 according to an embodiment of the present disclosure includes a storage 110, an authenticator 120, a key table generator 130, and an encryption/decryption unit 140.

The storage 110 stores a portion of a cipher algorithm for encryption or decryption. In detail, the cipher algorithm may be implemented to perform encryption or decryption with at least one static key table and at least one dynamic key table, and the storage 110 may store the remaining portion of the cipher algorithm other than the dynamic key table. For example, when the cipher algorithm is composed of at least one static key table and at least one dynamic key table, the storage 110 may store the static key table.

In this case, the key table may refer to a lookup table composed of random values induced from a seed value. Also, the static key table may refer to an unchanged key table that is applied in advance during generation of the cipher algorithm, and the dynamic key table may refer to a key table that is generated later and then added to or updated.

The static key table may be independent of the dynamic key table. In this case, the static key table being independent means that the static key table is independently generated irrespective of the dynamic key table, and thus is not changed according to a change of the dynamic key table in the cipher algorithm.

According to an embodiment of the present disclosure, the cipher algorithm may be a white-box cipher algorithm that is implemented by applying at least one static key table and at least one dynamic key table to a block cipher algorithm.

For example, the cipher algorithm may be a white-box cipher algorithm that is implemented by applying a plurality of key tables to a block cipher algorithm such as an Advanced Encryption Standard (AES) algorithm, a Data Encryption Standard (DES) algorithm, an International Data Encryption (IDEA) algorithm, and a Blowfish algorithm.

Figure 2:
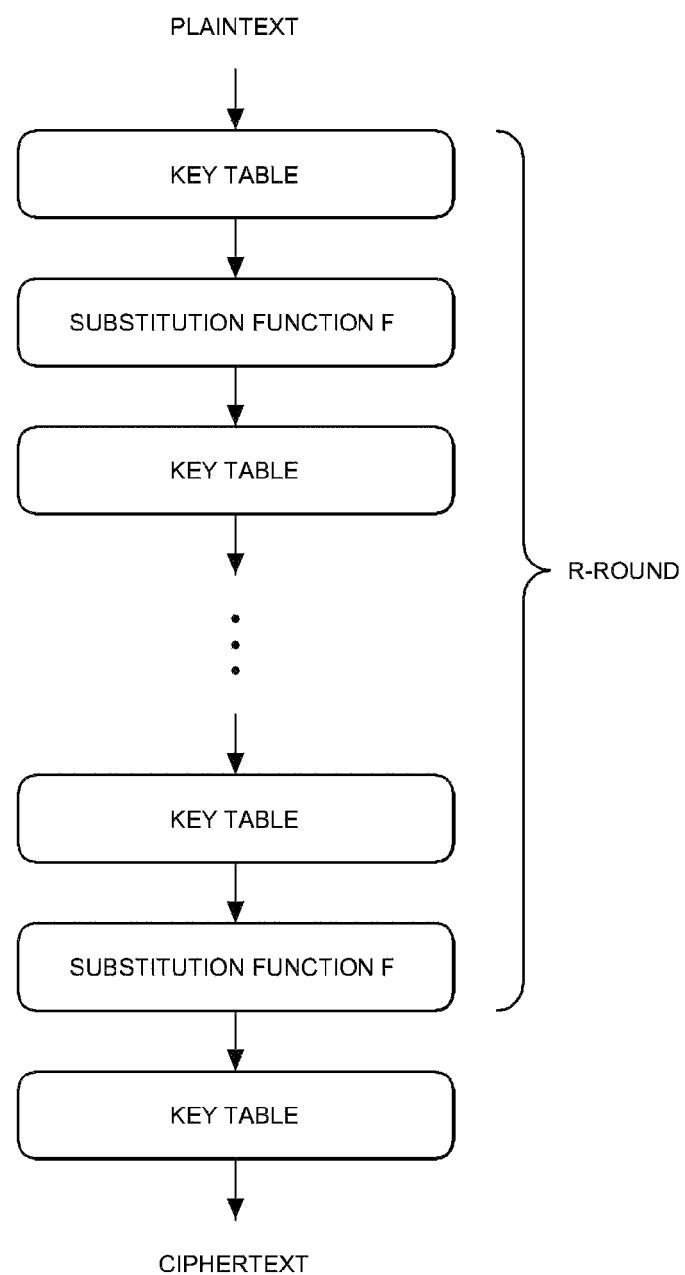
FIG. 2 is a diagram showing an example of a cipher algorithm according to an embodiment of the present disclosure.

For example, as shown in FIG. 2, the cipher algorithm may be a cipher algorithm generated by alternately and repeatedly combining a substitution function F and a plurality of key tables on the basis of the Even-Mansour scheme. In this case, the plurality of key tables may include a static key table and a dynamic key table.

The substitution function F may refer to any form of function that is cryptographically safe and configured to output input values as different values having the same length, and may include a block cipher algorithm such as, for example, an AES algorithm, a DES algorithm, a 3DES algorithm, an IDEA algorithm, and a Blowfish algorithm.

Figure 3:
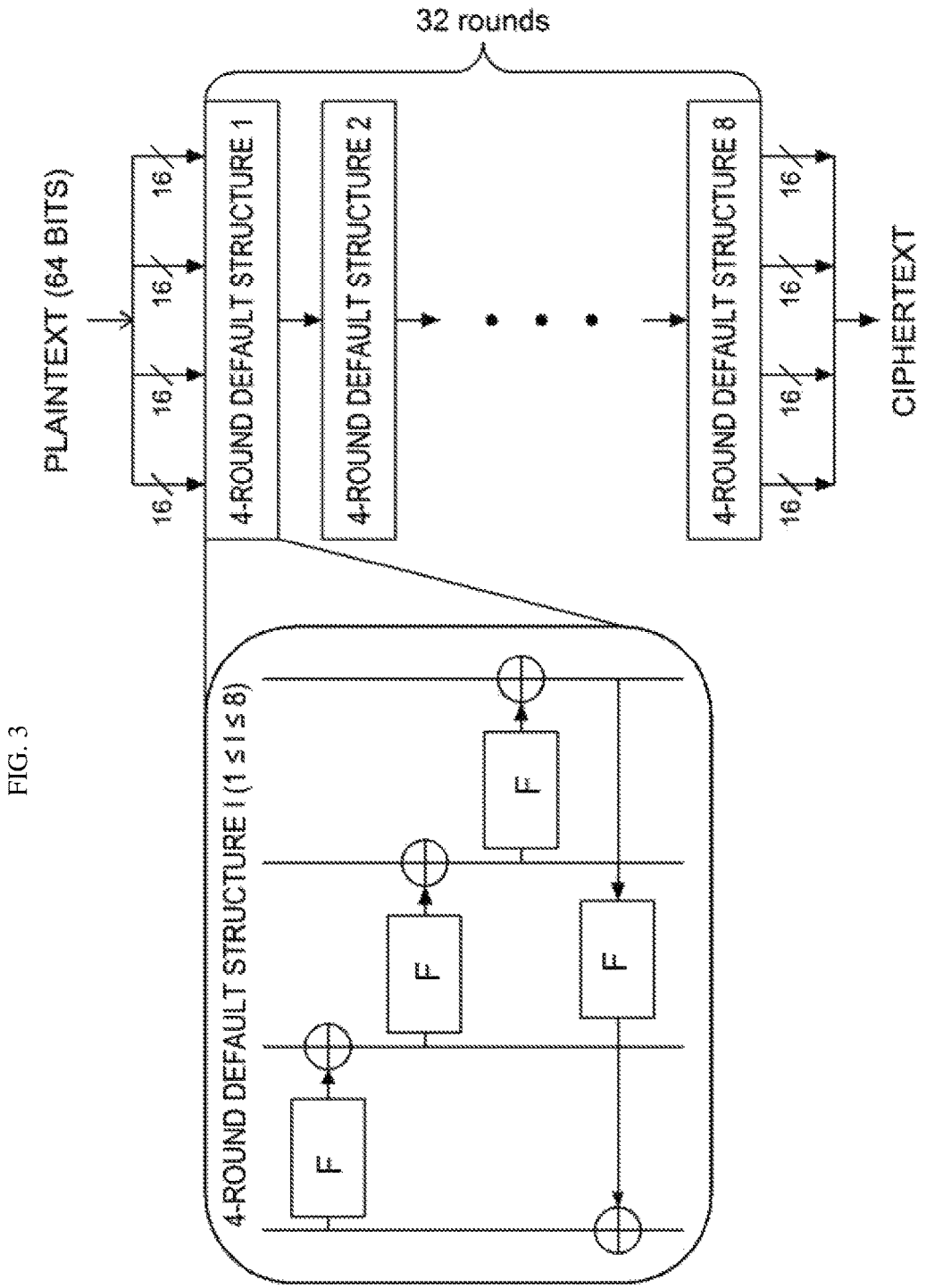
FIG. 3 is a diagram showing an example of a cipher algorithm according to another embodiment of the present disclosure.

As another example, the cipher algorithm may be a cipher algorithm obtained by applying the key tables to each round function F of a Feistel structure of a Feistel-structured block cipher algorithm such as, for example, a DES algorithm, as shown in FIG. 3. In this case, the key tables applied to each round function may include a static key table and a dynamic key table.

In an implementation step for a cipher algorithm, a developer may predetermine the number of static key tables and dynamic key tables included in the cipher algorithm and positions at which the static key tables and the dynamic key tables are to be applied. Also, the remaining portion of the cipher algorithm other than the dynamic key tables may be stored in advance in the encryption apparatus 100 and provided to a user or may be received from a separate server through a safe channel and then stored.

The authenticator 120 performs authentication with an external apparatus. In this case, the external apparatus may be an apparatus that shares the remaining portion of the cipher algorithm stored in the storage 110.

In order to perform the authentication, the authenticator 120 may use various well-known authentication methods for sharing authentication information between both parties through authentication, for example, a password-based authentication method, a challenge-response authentication method, etc.

The key table generator 130 generates at least one dynamic key table using authentication information acquired through the authentication performed by the authenticator 120.

In detail, the key table generator 130 may generate the at least one dynamic key table using authentication information shared with the external apparatus through the authentication performed by the authenticator 120. In this case, the authentication information may be different depending on an authentication method used for the authentication.

Figure 4:
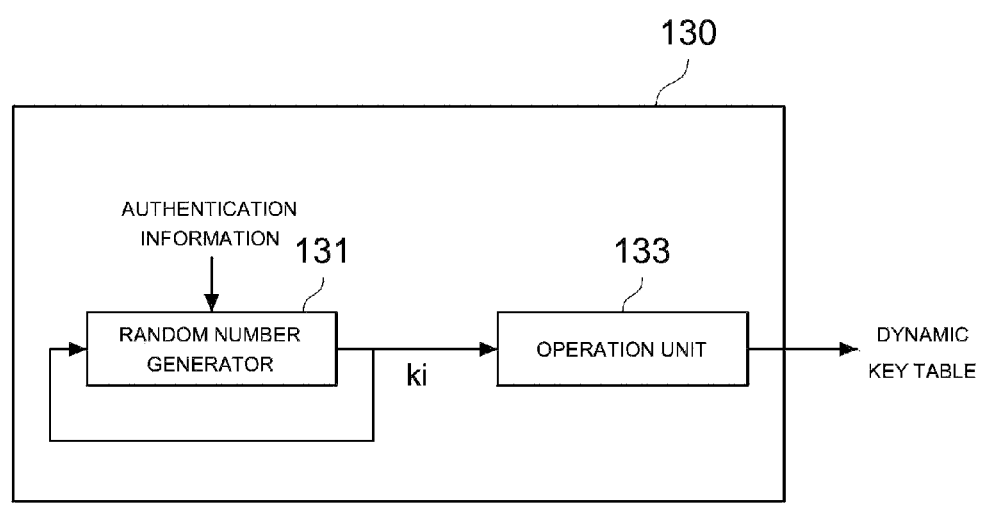
FIG. 4 is a block diagram of a key table generator according to an embodiment of the present disclosure.

In detail, referring to FIG. 4, the key table generator 130 according to an embodiment of the present disclosure may include a random number generator 131 configured to generate a random number from the authentication information, and an operation unit 133 configured to generate a dynamic key table using the generated random number.

The random number generator 131 may receive the authentication information from the authenticator 120 and repeatedly generate a random number ki.

For example, when it is assumed that three random numbers are generated, the random number generator 131 may generate a first random number from the received authentication information and then generate a second random number from the generated first random number. Subsequently, the random number generator 131 may generate a third random number from the generated second random number.

The operation unit 133 may generate random values for configuring a dynamic key table from the random numbers generated by the random number generator 131, and may generate at least one dynamic random key table including the generated random values.

In detail, the operation unit 133 may generate random values by using a round function for generating a random value and apply the random number ki generated by the random number generator 131 to the round function every round.

Figure 5:
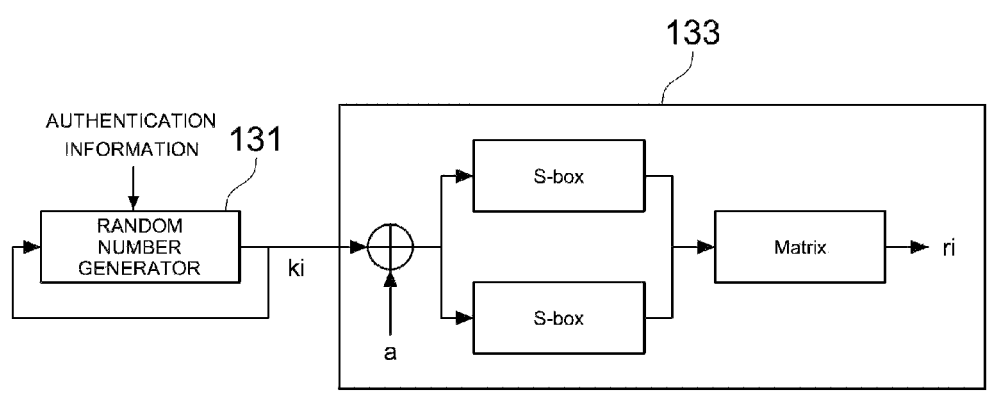
FIG. 5 is a diagram showing an example of a round function used in an operation unit according to an embodiment of the present disclosure.

In detail, FIG. 5 is a diagram showing an example of a round function used by the operation unit 133.

Referring to FIG. 5, the operation unit 133 may perform an XOR operation between the random number ki generated by the random number generator 131 and a random value a with the same size as the random number ki, and may divide a result of the XOR operation into two parts and apply the two parts to S-boxes.

Subsequently, the operation unit 133 may perform a matrix operation between output result values of the two S-boxes to generate a random value ri. In this case, various matrix operations with characteristics for maximizing a diffusion effect on an input value, such as a matrix operation using a maximum distance separable (MDS) matrix, may be used as the matrix operation.

The generation of a dynamic key table performed by the key table generator 130 is not necessarily limited to the examples shown in FIGS. 4 and 5. For example, the key table generator 130 may generate a dynamic key table from authentication information in various methods having a one-way property other than those shown in FIGS. 4 and 5.

Also, according to an embodiment of the present disclosure, the key table generator 130 may additionally use a variety of information shared with the external apparatus other than the authentication information acquired through the authentication process to generate the dynamic key table. As a detailed example, since the external apparatus pre-shares the remaining portion of the cipher algorithm other than the dynamic key table as described above, the key table generator 130 may use a static key table stored in the storage 110 as well as the authentication information shared through the authentication process performed with the external apparatus to generate a dynamic key table.

The encryption/decryption unit 140 performs encryption or decryption using the dynamic key table generated by the key table generator 130 and the static key table stored in the storage 110.

In detail, the encryption/decryption unit 140 may add at least one dynamic key table generated by the key table generator 130 to the remaining portion of the cipher algorithm stored in the storage 110. In this case, a position at which the dynamic key table is applied in the cipher algorithm may be preset by a developer of the cipher algorithm, and the encryption/decryption unit 140 may add the dynamic key table to the remaining portion of the cipher algorithm stored in the storage 110.

In an embodiment, the storage 110, the authenticator 120, the key table generator 130, and the encryption/decryption unit 140 shown in FIG. 1 may be implemented in at least one computing apparatus including at least one processor and a computer-readable recording medium connected with the processor. The computer-readable recording medium may be disposed inside or outside the processor, and may be connected to the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 6:
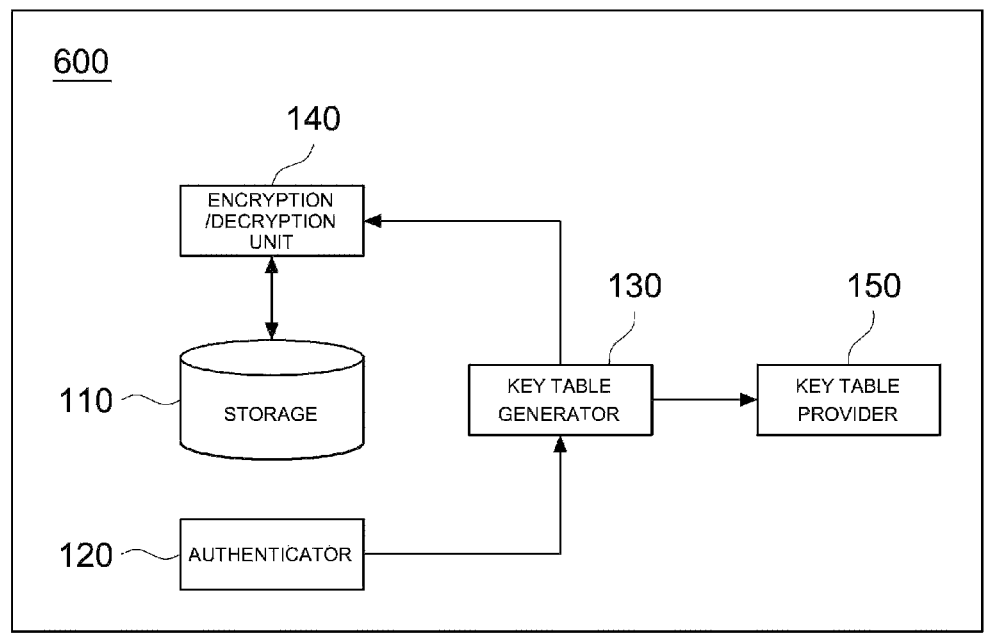
FIG. 6 is a block diagram of an encryption apparatus according to an additional embodiment of the present disclosure.

FIG. 6 is a block diagram of an encryption apparatus according to an additional embodiment of the present disclosure.

Referring to FIG. 6, an encryption apparatus 600 according to an additional embodiment of the present disclosure includes a storage 110, an authenticator 120, a key table generator 130, an encryption/decryption unit 140, and a key table provider 150.

In the example shown in FIG. 6, the storage 110, the authenticator 120, the key table generator 130, and the encryption/decryption unit 140 have the same configurations as shown in FIG. 1, and thus redundant descriptions thereof will be omitted.

When a dynamic key table is generated by the key table generator 130, the key table provider 150 provides the generated dynamic key table to an external apparatus. In detail, the encryption apparatus 100 and the external apparatus share the same dynamic key table in the embodiment shown in FIG. 1 by using the authentication information shared through the authentication process to generate the dynamic key table, but the encryption apparatus 100 and the external apparatus share the same dynamic key table in the embodiment shown in FIG. 6 by the key table provider 150 providing the dynamic key table generated by the key table generator 130 to the external apparatus.

In an embodiment, the storage 110, the authenticator 120, the key table generator 130, the encryption/decryption unit 140, and the key table provider 150 shown in FIG. 6 may be implemented in at least one computing apparatus including at least one processor and a computer-readable recording medium connected with the processor. The computer-readable recording medium may be disposed inside or outside the processor, and may be connected with the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 7:
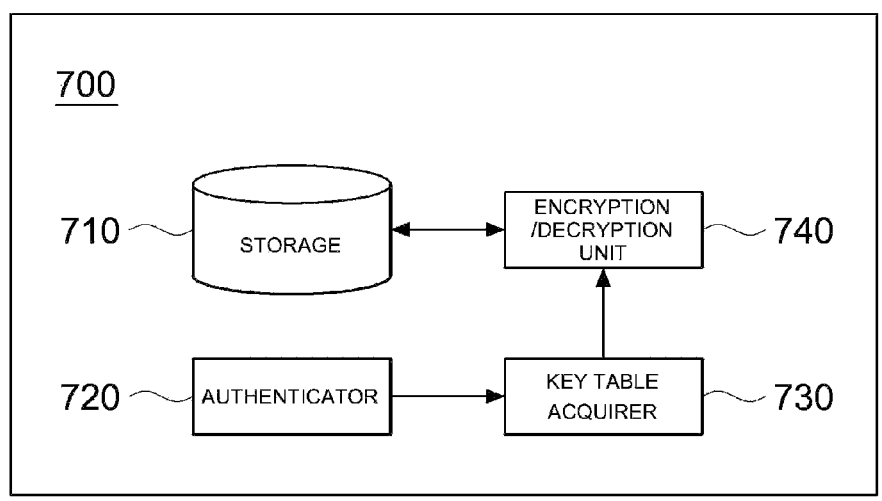
FIG. 7 is a block diagram of an encryption apparatus according to another embodiment of the present disclosure.

FIG. 7 is a block diagram of an encryption apparatus according to another embodiment of the present disclosure.

Referring to FIG. 7, an encryption apparatus 700 according to an embodiment of the present disclosure includes a storage 710, an authenticator 720, a key table acquirer 730, and an encryption/decryption unit 740.

In the example shown in FIG. 7, the storage 710, the authenticator 720, and the encryption/decryption unit 740 have the same configurations as shown in FIG. 1, and thus redundant descriptions thereof will be omitted.

The key table acquirer 730 acquires at least one dynamic key table from an external apparatus or a key table generation server.

For example, the key table acquirer 730 may receive at least one dynamic key table generated using authentication information shared through an authentication process with an external apparatus. In this case, the external apparatus may be, for example, the encryption apparatus 600 shown in FIG. 6. Depending on the embodiment, the dynamic key table received from the external apparatus may be generated using a static key table and the authentication information shared through the authentication process.

As another example, the key table acquirer 730 may provide authentication information shared with an external apparatus through the authentication process to a key table generation server. In this case, the key table generation server may generate at least one dynamic key table using the provided authentication information, and the key table acquirer 730 may receive the dynamic key table generated by the key table generation server. Also, the external apparatus may receive the dynamic key table generated by the key table generation server. Accordingly, the external apparatus and the encryption apparatus 700 share the same dynamic key table.

In an embodiment, the storage 710, the authenticator 720, the key table acquirer 730, and the encryption/decryption unit 740 shown in FIG. 7 may be implemented in at least one computing apparatus including at least one processor and a computer-readable recording medium connected with the processor. The computer-readable recording medium may be disposed inside or outside the processor, and may be connected with the processor using various well-known means. The processor in the computing apparatus may enable the computing apparatus to operate according to an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 8:
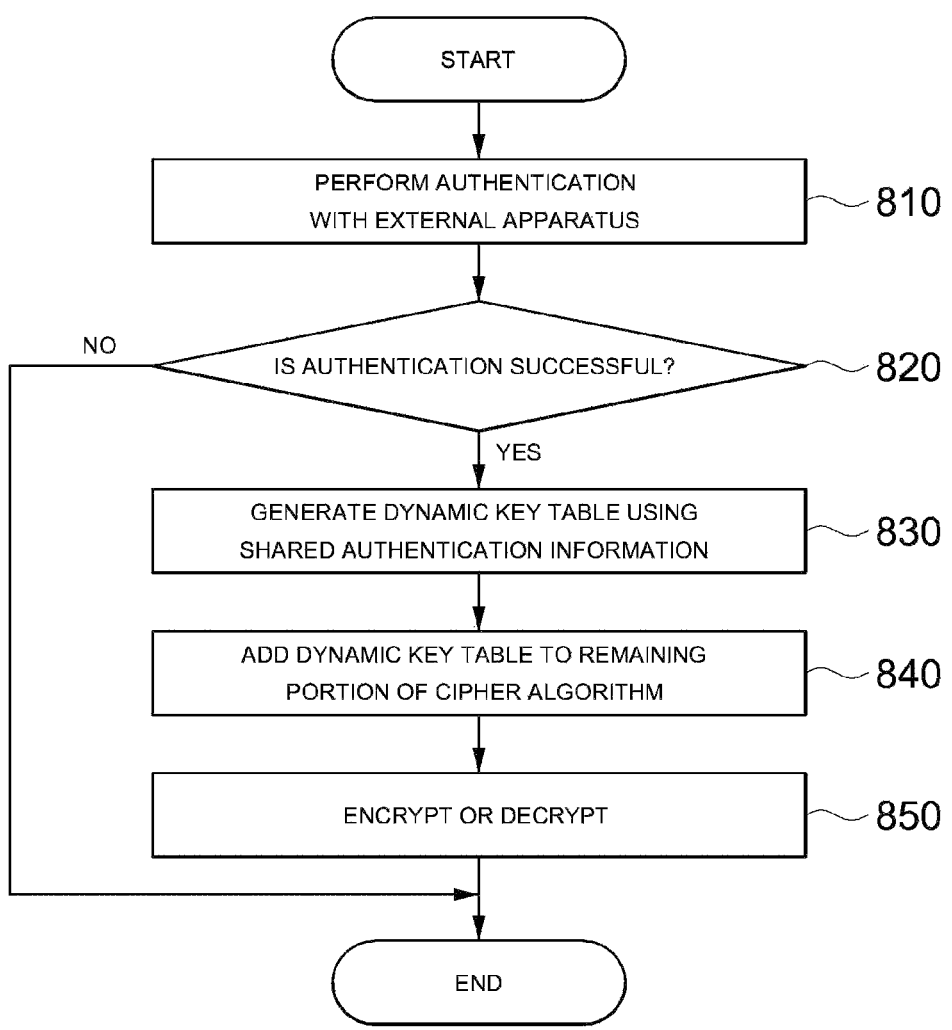
FIG. 8 is a flowchart of an encryption method according to an embodiment of the present disclosure.

FIG. 8 is a flowchart of an encryption method according to an embodiment of the present disclosure.

For example, the method shown in FIG. 8 may be performed by the encryption apparatus 100 shown in FIG. 1.

Referring to FIG. 8, first, the encryption apparatus 100 performs authentication with an external apparatus that shares the remaining portion of a cipher algorithm implemented to perform encryption or decryption using at least one static key table and at least one dynamic key table, other than the dynamic key table (810).

In this case, when the authentication is successful (820), the encryption apparatus 100 generates at least one dynamic key table using the authentication information shared with the external apparatus through the authentication (830).

In this case, according to an embodiment, the encryption apparatus 100 may generate the at least one dynamic key table using the shared authentication information and the static key table of the cipher algorithm.

Subsequently, the encryption apparatus 100 adds the generated dynamic key table to the remaining portion of the cipher algorithm (840).

Subsequently, the encryption apparatus 100 performs encryption or decryption using the cipher algorithm to which the dynamic key table is added (850).

Figure 9:
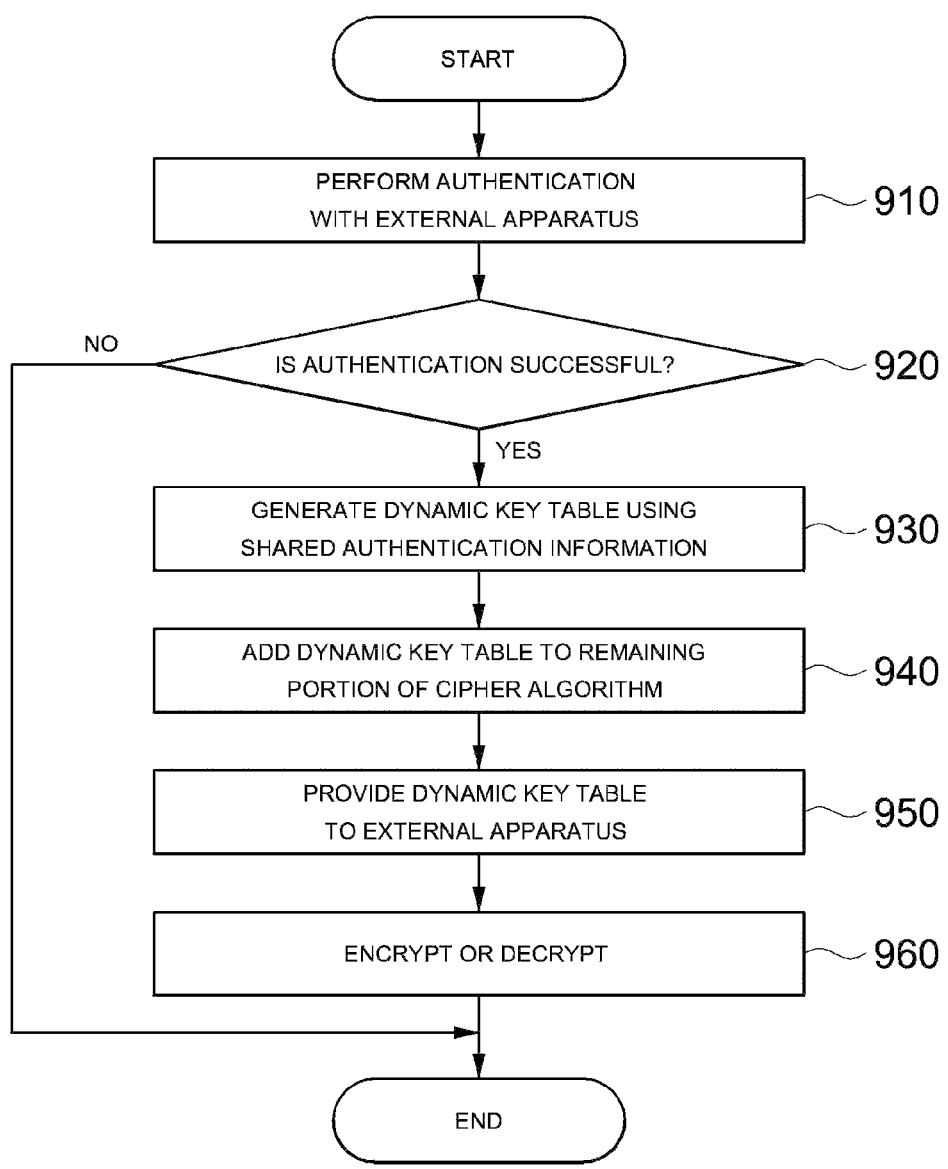
FIG. 9 is a flowchart of an encryption method according to an additional embodiment of the present disclosure.

FIG. 9 is a flowchart of an encryption method according to an additional embodiment of the present disclosure.

For example, the method shown in FIG. 9 may be performed by the encryption apparatus 600 shown in FIG. 6.

Referring to FIG. 9, first, the encryption apparatus 600 performs authentication with an external apparatus that shares the remaining portion of a cipher algorithm implemented to perform encryption or decryption using at least one static key table and at least one dynamic key table, other than the dynamic key table (910).

In this case, when the authentication is successful (920), the encryption apparatus 600 generates at least one dynamic key table using the authentication information shared with the external apparatus through the authentication (930).

In this case, according to an embodiment, the encryption apparatus 600 may generate the at least one dynamic key table using the shared authentication information and the static key table of the cipher algorithm.

Subsequently, the encryption apparatus 600 adds the generated dynamic key table to the remaining portion of the cipher algorithm (940).

Subsequently, the encryption apparatus 600 provides the generated dynamic key table to the external apparatus (950).

Subsequently, the encryption apparatus 600 performs encryption or decryption using the cipher algorithm to which the dynamic key table is added (960).

Figure 10:
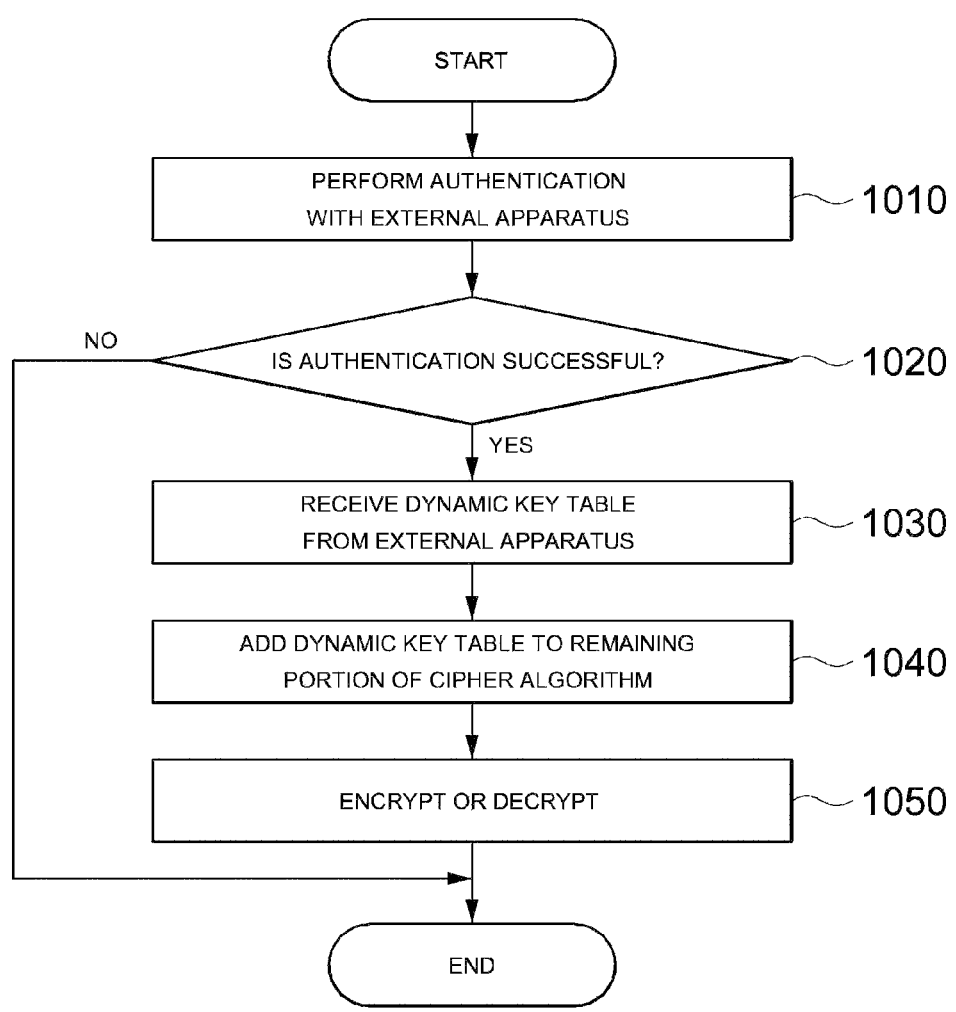
FIG. 10 is a flowchart of an encryption method according to another embodiment of the present disclosure.

FIG. 10 is a flowchart of an encryption method according to another embodiment of the present disclosure.

For example, the method shown in FIG. 10 may be performed by the encryption apparatus 700 shown in FIG. 7.

Referring to FIG. 10, first, the encryption apparatus 700 performs authentication with an external apparatus that shares the remaining portion of a cipher algorithm implemented to perform encryption or decryption using at least one static key table and at least one dynamic key table, other than the dynamic key table (1010).

In this case, when the authentication is successful (1020), the encryption apparatus 700 receives at least one dynamic key table generated using the authentication information shared through the authentication process from the external apparatus (1030).

In this case, depending on the embodiment, the received dynamic key table may be generated using the static key table and the shared authentication information.

Subsequently, the encryption apparatus 700 adds the received dynamic key table to the remaining portion of the cipher algorithm (1040).

Subsequently, the encryption apparatus 700 performs encryption or decryption using the cipher algorithm to which the dynamic key table is added (1050).

Figure 11:
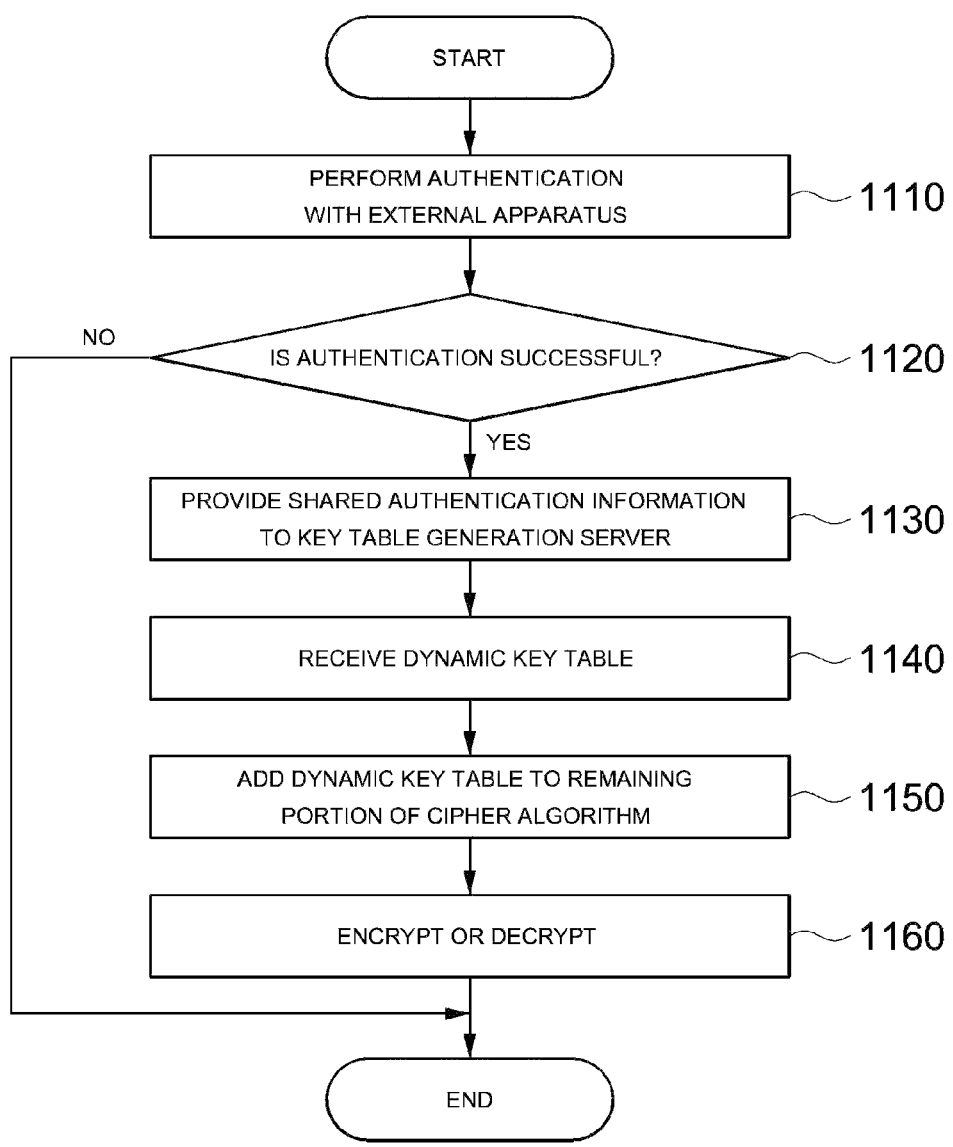
FIG. 11 is a flowchart of an encryption method according to still another embodiment of the present disclosure.

FIG. 11 is a flowchart of an encryption method according to still another embodiment of the present disclosure.

For example, the method shown in FIG. 11 may be performed by the encryption apparatus 700 shown in FIG. 7.

Referring to FIG. 11, first, the encryption apparatus 700 performs authentication with an external apparatus that shares the remaining portion of a cipher algorithm implemented to perform encryption or decryption using at least one static key table and at least one dynamic key table, other than the dynamic key table (1110).

In this case, when the authentication is successful (1120), the encryption apparatus 700 provides authentication information shared with the external apparatus through the authentication process to the key table generation server (1130).

Subsequently, the encryption apparatus 700 receives at least one dynamic key table generated using the authentication information from the key table generation server (1140).

Subsequently, the encryption apparatus 700 adds the received dynamic key table to the remaining portion of the cipher algorithm (1150).

Subsequently, the encryption apparatus 700 performs encryption or encryption using the cipher algorithm to which the dynamic key table is added (1160).

In the flowcharts shown in FIGS. 8 to 11, the methods have been described as having a plurality of steps. However, at least some of the steps may be performed in a changed order, performed in combination with another step, omitted, divided into sub-steps, or performed in addition to one or more steps that are not shown.

Embodiments of the present disclosure may include a computer-readable recording medium including a program for executing the methods described herein on a computer. The computer-readable recording medium may include any one or a combination of a program instruction, a local data file, a local data structure, etc. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a CD-ROM and a DVD, a magneto-optical medium, such as a floptical disk, and a hardware device specially configured to store and perform a program instruction, such as a ROM, a RAM, and a flash memory. Examples of the program instruction may include a machine code generated by a compiler and a high-level language code that can be executed in a computer using an interpreter.

According to embodiments of the present disclosure, by sharing only a portion of an implementation of a cipher algorithm, instead of sharing the entire implementation of the cipher algorithm, and then generating the remaining portion through authentication when an encryption/decryption service is applied to share the generated portion, it is possible to prevent use of an unauthorized user and enhance safety in various embodiments including an Internet of things (IoT) that is vulnerable to an attack such as an attack for stealing an algorithm.

Although example embodiments of the present disclosure have been described in detail, it will be understood by those skilled in the art that various changes may be made without departing from the spirit or scope of the present disclosure. Thus, the scope of the present disclosure is to be determined by the following claims and their equivalents, and shall not be restricted or limited by the foregoing detailed description.

What is claimed is:

1. An encryption apparatus comprising:
a storage configured to store a cipher algorithm including at least one static key table; and
at least one processor configured to implement:
an authenticator configured to perform authentication with an external apparatus storing the at least one static key table;
a key table generator configured to generate at least one dynamic key table using authentication information acquired through the authentication; and
an encryption/decryption unit configured to add the at least one dynamic key table to the cipher algorithm and perform encryption or decryption using the cipher algorithm to which the at least one dynamic key table is added,
wherein each of the at least one static key table is an unchanged lookup table that is applied in advance during generation of the cipher algorithm, and
wherein the key table generator is further configured to generate the at least one dynamic key table using the at least one static key table included in the cipher algorithm and the authentication information.

2. The encryption apparatus of claim 1, wherein the at least one processor is further configured to implement a key table provider configured to provide the at least one dynamic key table to the external apparatus.

3. An encryption apparatus comprising:
a storage configured to store a cipher algorithm including at least one static key table; and
at least one processor configured to implement:
an authenticator configured to perform authentication with an external apparatus storing the at least one static key table;
a key table acquirer configured to transmit authentication information acquired through the authentication to a key table generation server and receive at least one dynamic key table generated using the transmitted authentication information from the key table generation server; and
an encryption/decryption unit configured to add the at least one dynamic key table to the cipher algorithm and perform encryption or decryption using the cipher algorithm to which the at least one dynamic key table is added,
wherein each of the at least one static key table is an unchanged lookup table that is applied in advance during generation of the cipher algorithm, and
wherein the key table acquirer is further configured to receive the at least one dynamic key table generated using the at least one static key table stored in the key table generation server and the transmitted authentication information from the key table generation server.

4. An encryption apparatus comprising:
a storage configured to store a cipher algorithm including at least one static key table; and
at least one processor configured to implement:
an authenticator configured to perform authentication with an external apparatus storing the at least one static key table;
a key table acquirer configured to receive, from the external apparatus, at least one dynamic key table generated using authentication information acquired through the authentication; and
an encryption/decryption unit configured to add the at least one dynamic key table to the cipher algorithm and perform encryption or decryption using the cipher algorithm to which the at least one dynamic key table is added,
wherein each of the at least one static key table is an unchanged lookup table that is applied in advance during generation of the cipher algorithm, and
wherein the key table acquirer is further configured to receive the at least one dynamic key table generated using the at least one static key table stored in the external apparatus and the authentication information from the external apparatus.

5. An encryption method comprising:
storing a cipher algorithm including at least one static key table;
performing authentication with an external apparatus storing the at least one static key table;
generating at least one dynamic key table using authentication information acquired through the authentication;
adding the at least one dynamic key table to the cipher algorithm; and
performing encryption or decryption using the cipher algorithm to which the at least one dynamic key table is added,
wherein each of the at least one static key table is an unchanged lookup table that is applied in advance during generation of the cipher algorithm, and
wherein generating at least one dynamic key table generates the at least one dynamic key table using the at least one static key table included in the cipher algorithm and the authentication information.

6. The encryption method of claim 5, further comprising providing the at least one dynamic key table to the external apparatus.

7. An encryption method comprising:
storing a cipher algorithm including at least one static key table;
performing authentication with an external apparatus storing the at least one static key table;
transmitting authentication information acquired through the authentication to a key table generation server;
receiving, from the key table generation server, at least one dynamic key table generated using the transmitted authentication information;
adding the at least one dynamic key table to the cipher algorithm; and
performing encryption or decryption using the cipher algorithm to which the at least one dynamic key table is added,
wherein each of the at least one static key table is an unchanged lookup table that is applied in advance during generation of the cipher algorithm, and
wherein receiving the at least one dynamic key table receives the at least one dynamic key table generated using at least one static key table stored in the key table generation server and the transmitted authentication information from the key table generation server.

8. An encryption method comprising:
storing a cipher algorithm including at least one static key table;
performing authentication with an external apparatus storing the at least one static key table;
receiving, from the external apparatus, at least one dynamic key table generated using authentication information acquired through the authentication;
adding the at least one dynamic key table to the cipher algorithm; and
performing encryption or decryption using the cipher algorithm to which the at least one dynamic key table is added,
wherein each of the at least one static key table is an unchanged lookup table that is applied in advance during generation of the cipher algorithm, and
wherein receiving the at least one dynamic key table receives the at least one dynamic key table generated using the at least one static key table stored in the external apparatus and the authentication information from the external apparatus.

* * * * *